(12) United States Patent
Mizuno et al.

(10) Patent No.: US 11,008,005 B2
(45) Date of Patent: May 18, 2021

(54) VEHICLE TRAVEL CONTROL APPARATUS

(71) Applicant: Honda Motor Co., Ltd., Tokyo (JP)

(72) Inventors: Toshiyuki Mizuno, Wako (JP); Takayuki Kishi, Wako (JP); Akira Kito, Wako (JP); Yoshiaki Konishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 16/264,405

(22) Filed: Jan. 31, 2019

(65) Prior Publication Data
US 2019/0248366 A1 Aug. 15, 2019

(30) Foreign Application Priority Data

Feb. 9, 2018 (JP) .............................. JP2018-021470

(51) Int. Cl.
*B60W 30/14* (2006.01)
*G05D 1/02* (2020.01)
(Continued)

(52) U.S. Cl.
CPC .......... *B60W 30/143* (2013.01); *B60W 10/02* (2013.01); *B60W 10/04* (2013.01);
(Continued)

(58) Field of Classification Search
CPC .. B60W 30/143; B60W 30/16; B60W 30/085; B60W 30/09; B60W 30/095; B60W 10/02; B60W 10/04; B60W 10/11; B60W 2552/00; B60W 2552/801; B60W 2710/02; B60W 2710/0644; B60W 2710/10; B60W 2710/1005; B60W 2710/1011

See application file for complete search history.

(56) References Cited

U.S. PATENT DOCUMENTS

| 2006/0015240 A1* | 1/2006 | Shima ................ B60K 31/0008 701/93 |
| 2012/0046841 A1* | 2/2012 | Wurthner ............ B60W 30/143 701/54 |

(Continued)

FOREIGN PATENT DOCUMENTS

| JP | 2002225587 A | 8/2002 |
| JP | 2009078809 A | 4/2009 |

(Continued)

*Primary Examiner* — Ig T An
(74) *Attorney, Agent, or Firm* — Duft & Bornsen, PC

(57) ABSTRACT

A vehicle travel control apparatus configured to control an actuator for driving a vehicle with a self-driving capability so that the vehicle follows a forward vehicle in front of the vehicle. The vehicle travel control apparatus includes a travel state detector configured to detect a traveling state of the forward vehicle, and an electric control unit having a microprocessor and a memory. The microprocessor is configured to perform determining whether the forward vehicle is cruising based on the traveling condition detected by the travel state detector, and controlling the actuator so that the vehicle travels in a normal mode, when it is determined that the forward vehicle is not cruising, and the vehicle follows the forward vehicle in a cruise mode with a fuel economy performance or quietness higher than in the normal mode, when the forward vehicle is cruising.

13 Claims, 9 Drawing Sheets

(51) Int. Cl.
　　　*B60W 10/02*　　　(2006.01)
　　　*B60W 10/11*　　　(2012.01)
　　　*B60W 10/04*　　　(2006.01)

(52) U.S. Cl.
　　　CPC ........... *B60W 10/11* (2013.01); *G05D 1/0223*
　　　　　(2013.01); *B60W 2552/00* (2020.02); *B60W*
　　　*2554/801* (2020.02); *B60W 2710/02* (2013.01);
　　　　*B60W 2710/0644* (2013.01); *B60W 2710/1005*
　　　　　　　　　　　　　　　　　　　　　　　　(2013.01)

(56)　　　　　　　　References Cited

U.S. PATENT DOCUMENTS

2017/0303842 A1\* 10/2017 Yoshida ............ B60W 50/0097
2017/0327116 A1\* 11/2017 Heo ................ B60W 30/18018
2019/0025825 A1　　 1/2019 Takahama

FOREIGN PATENT DOCUMENTS

JP　　　　2017049629 A　　3/2017
JP　　　　2017132290 A　　8/2017

\* cited by examiner

VEHICLE TRAVEL CONTROL APPARATUS

CROSS-REFERENCE TO RELATED APPLICATION

This application is based upon and claims the benefit of priority from Japanese Patent Application No. 2018-021470 filed on Feb. 9, 2018, the content of which is incorporated herein by reference.

BACKGROUND OF THE INVENTION

Field of the Invention

This invention relates to a vehicle travel control apparatus configured to control an actuator for driving a self-driving vehicle so as to follow a forward vehicle.

Description of the Related Art

Conventionally, there is a known apparatus that prepares for anticipated acceleration demand by adding excess driving force to required driving force and controls traveling of a vehicle based on the incremented driving force. In Japanese Unexamined Patent Publication No. 2009-078809 (JP2009-078809A), for example, an apparatus of this type is disclosed that lowers excess driving force more when the vehicle including the apparatus follows a vehicle ahead (performs vehicle-following) than when it does not perform vehicle-following However, driving force required during vehicle-following varies depending on traveling condition of the vehicle ahead. So when excess driving force is simply lowered during vehicle-following as in the case of the apparatus according to JP2009-078809A, optimum improvement of fuel economy and quietness is hard to achieve during cruising, which is the travel mode requiring minimum driving force.

SUMMARY OF THE INVENTION

An aspect of the present invention is a vehicle travel control apparatus configured to control an actuator for driving a vehicle with a self-driving capability so that the vehicle follows a forward vehicle in front of the vehicle. The vehicle travel control apparatus includes a travel state detector configured to detect a traveling state of the forward vehicle, and an electric control unit having a microprocessor and a memory. The microprocessor is configured to perform determining whether the forward vehicle is cruising based on the traveling condition detected by the travel state detector, and controlling the actuator so that the vehicle travels in a normal mode, when it is determined that the forward vehicle is not cruising, and the vehicle follows the forward vehicle in a cruise mode with a fuel economy performance or quietness higher than in the normal mode, when the forward vehicle is cruising.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
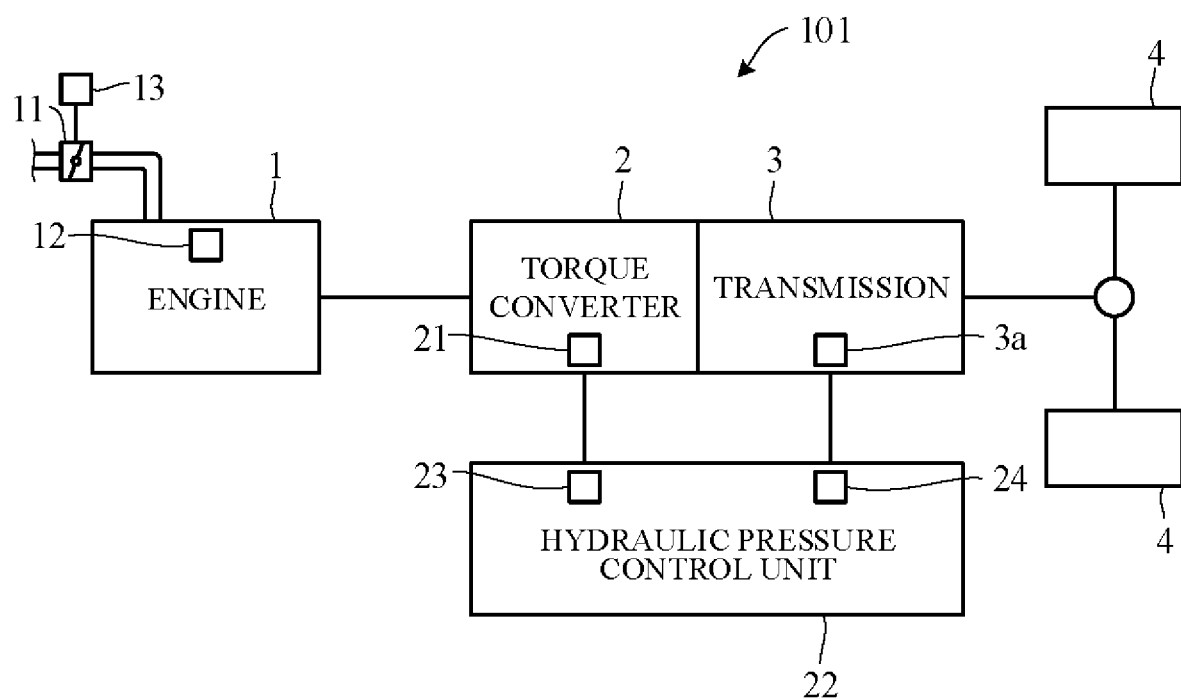
FIG. 1 is a diagram showing a configuration overview of a driving system of a self-driving vehicle to which a vehicle travel control apparatus according to an embodiment of the present invention is applied.

Hereinafter, an embodiment of the present invention is explained with reference to FIGS. 1 to 15. A vehicle travel control apparatus according to an embodiment of the present invention is applied to a vehicle (self-driving vehicle) having a self-driving capability. FIG. 1 is a diagram showing a configuration overview of a driving system of a self-driving vehicle 101 incorporating a travel control apparatus according to the present embodiment. Herein, the self-driving vehicle may be sometimes called "subject vehicle" to differentiate it from other vehicles. The vehicle 101 is not limited to driving in a self-drive mode requiring no driver driving operations but is also capable of driving in a manual drive mode by driver operations.

Figure 2:
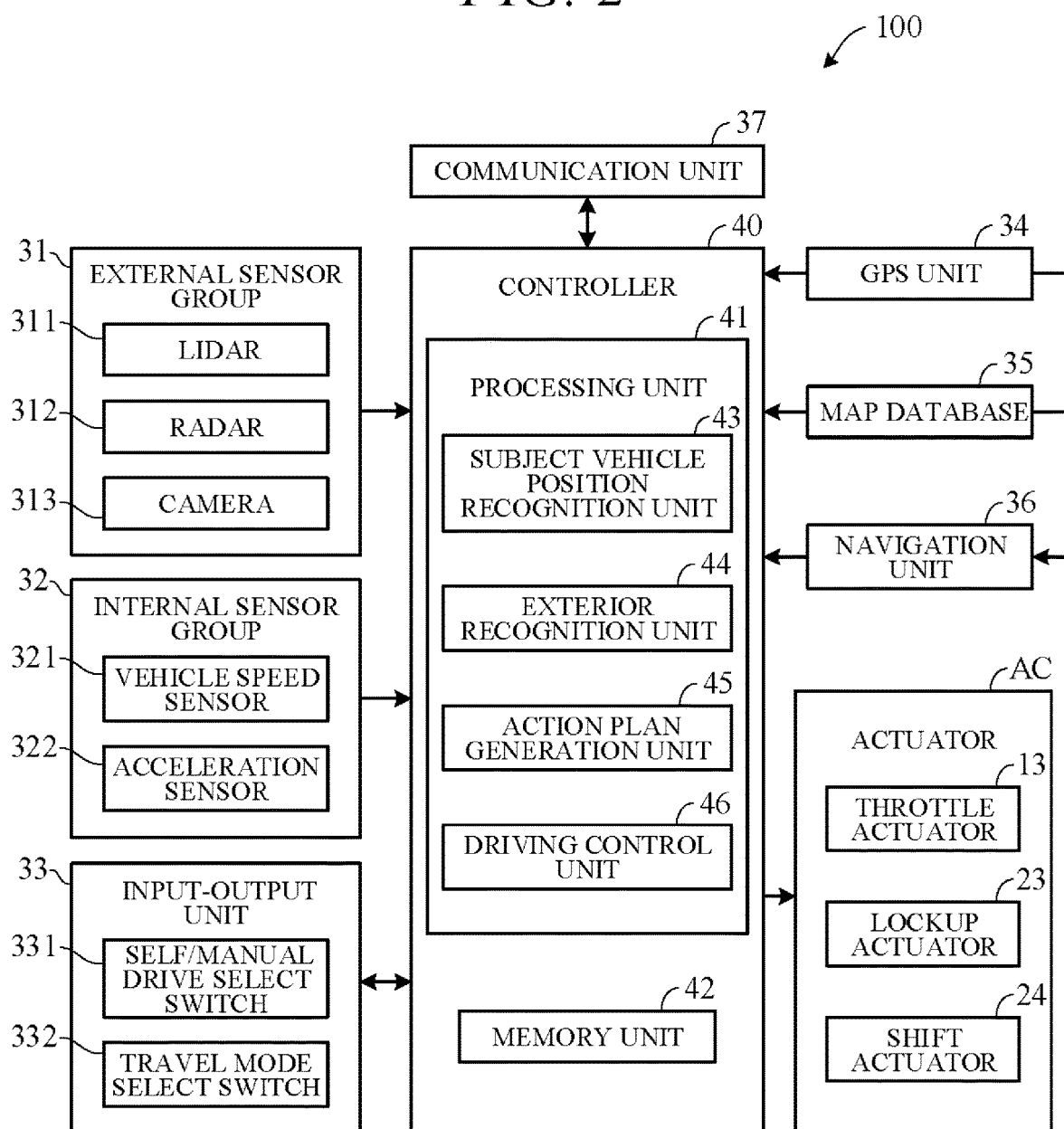
FIG. 2 is a block diagram schematically illustrating overall configuration of the vehicle travel control apparatus according to an embodiment of the present invention.

As shown in FIG. 1, the vehicle 101 includes an engine 1, a torque converter 2 and a transmission 3. The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve 11 (throttle opening angle) is changed by a throttle actuator 13 operated by an electric signal. The opening angle of the throttle valve 11 and an amount of fuel injected from the injector 12 (injection timing and injection time) are controlled by a controller 40 (FIG. 2).

The torque converter 2 is a hydraulic power transmission for transmitting torque via fluid (hydraulic oil). The torque converter 2 includes a pump impeller connected to an output shaft of the engine 1, a turbine runner connected to an input shaft of the transmission 3, and a lockup clutch 21. In a state that the lockup clutch 21 is disengaged (lockup OFF state), torque is transmitted via fluid from the engine 1 to the transmission 3. For example, at the time of travel starting, the torque converter 2 is in lockup OFF state.

In a state that the lockup clutch 21 is completely engaged without slipping (lockup ON state), the pump impeller and the turbine runner are mechanically and directly connected, and thus torque is transmitted via no fluid from the engine 1 to the transmission 3. For example, during traveling at a vehicle speed equal to or more than a predetermined vehicle speed, the torque converter 2 is in lockup ON state. Torque converter 2 can transmit torque from the engine 1 to the transmission 3 while slipping at the lockup clutch 21. It is possible to adjust a rate of an engine speed and a speed of the input shaft of the transmission 3 in accordance with slipping of the lockup clutch 21.

The lockup clutch 21 is disengaged (OFF), engaged (ON) or slipped by controlling hydraulic pressure acting on the lockup clutch 21 by a hydraulic pressure control unit 22. The hydraulic pressure control unit 22 includes a solenoid valve or other valve mechanism operated by electric signals and used for driving the lockup clutch 21 (called "lockup actuator 23" for sake of convenience). The lockup clutch 21 is driven to ON state, OFF state of slip state by controlling hydraulic pressure to the lockup clutch 21 in accordance with operation of the lockup actuator 23.

The transmission 3 is, for example, a stepped transmission enabling stepwise speed ratio (gear ratio) shifting in accordance with multiple (e.g. eight) speed stages. Optionally, a continuously variable transmission enabling stepless speed ratio shifting can be used as the transmission 3. The transmission 3, which is installed in a power transmission path between the torque converter 2 and drive wheels 4, varies speed of rotation input from the torque converter 2, and converts and outputs torque input from the torque converter 2. The rotation of speed converted by the transmission 3 is transmitted to the drive wheels 4, thereby propelling the vehicle 101. Optionally, the vehicle 101 can be configured as a hybrid vehicle by providing a drive motor as a drive power source in addition to the engine 1.

The transmission 3 can, for example, incorporate a dog clutch, friction clutch or other engaging element 3a. A hydraulic pressure control unit 22 can shift speed stage of the transmission 3 by controlling flow of oil to the engaging element 3a. The hydraulic pressure control unit 22 includes a solenoid valve or other valve mechanism operated by electric signals (called "shift actuator 24" for sake of convenience), and an appropriate speed stage can be implemented by changing flow of hydraulic pressure to the engaging element 3a in response to operation of the shift actuator 24.

FIG. 2 is a block diagram schematically illustrating overall configuration of a vehicle travel control apparatus (vehicle travel control system) 100 according to an embodiment of the present invention. As shown in FIG. 2, the vehicle travel control apparatus 100 includes mainly of the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR 311 (Light Detection and Ranging) for measuring distance from the vehicle to ambient obstacles by measuring scattered light produced by laser light radiated from the subject vehicle in every direction, a RADAR 312 (Radio Detection and Ranging) for detecting other vehicles and obstacles around the subject vehicle by radiating electromagnetic waves and detecting reflected waves, and a CCD, CMOS or other image sensor equipped on-board cameras 313 for imaging subject vehicle ambience (forward, reward and sideways).

The term internal sensor group 32 herein is a collective designation encompassing multiple sensors (internal sensors) for detecting subject vehicle driving state. For example, the internal sensor group 32 includes, inter alia, a vehicle speed sensor 321 for detecting vehicle speed of the subject vehicle and acceleration sensors 322 for detecting forward-rearward direction acceleration and lateral acceleration of the subject vehicle, respectively. Further the internal sensor group 32 includes an engine speed sensor for detecting rotational speed of the engine 1 (engine speed), a yaw rate sensor for detecting rotation angle speed around a vertical axis through subject vehicle center of gravity, and a throttle opening sensor for detecting opening angle of the throttle valve 11 (throttle opening angle). The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. The input-output unit 33 includes, inter alia, switches which the driver uses to input various instructions (for example, a self/manual drive select switch 331 and a travel mode select switch 332), a microphone which the driver uses to input voice instructions, a display for presenting information to the driver via displayed images, and a speaker for presenting information to the driver by voice.

The self/manual drive select switch 331, for example, is configured as a switch manually operable by the driver to output an instruction of switching to a self-drive mode enabling self-drive functions or a manual drive mode disabling self-drive functions in accordance with operation of the switch. Optionally, the self/manual drive select switch 331 can be configured to instruct switching from manual drive mode to self-drive mode or from self-drive mode to manual drive mode when a predetermined condition is satisfied without operating the self/manual drive select switch 331. In other words, drive mode can be switched automatically not manually in response to automatic switching of the self/manual drive select switch.

The travel mode select switch 332, for example, is configured as a switch manually operable by the driver to output an instruction of selecting one of travel modes. The travel modes include normal mode that balances fuel economy performance and power performance, and sport mode that prioritizes power performance over fuel economy performance. The travel modes can also include economy mode that prioritizes fuel economy performance over power performance. One of these travel modes is instructed in accordance with operation of the travel mode select switch 332.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a throttle actuator 13 for adjusting opening angle of the throttle valve of the engine 1 (throttle opening angle), a lockup actuator 23 for driving the lockup clutch 21 and a shift actuator 24 for changing speed stage of the transmission 3. Further, although not shown in the drawings, the actuators AC include a brake actuator for operating a braking device, and a steering actuator for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits such as I/O interface not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from LIDARs 311, RADARs 312, cameras 313 and the like of the external sensor group 31. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time $\Delta t$ (e.g., 0.1 sec) between present time point and a predetermined time period T (e.g., 5 sec) ahead, i.e., includes action plan data set in association with every unit time $\Delta t$ interval. The action plan data include subject vehicle position data and vehicle state data for every unit time $\Delta t$. The position data are, for example, target point data indicating 2D coordinate position on road, and the vehicle state data are vehicle speed data indicating vehicle speed, direction data indicating subject vehicle direction, and the like. Therefore, when accelerating the subject vehicle to target vehicle speed within the predetermined time period T, the action plan includes target vehicle speed data. The vehicle state data can be determined from position data change of successive unit times $\Delta t$. Action plan is updated every unit time $\Delta t$.

Figure 3:
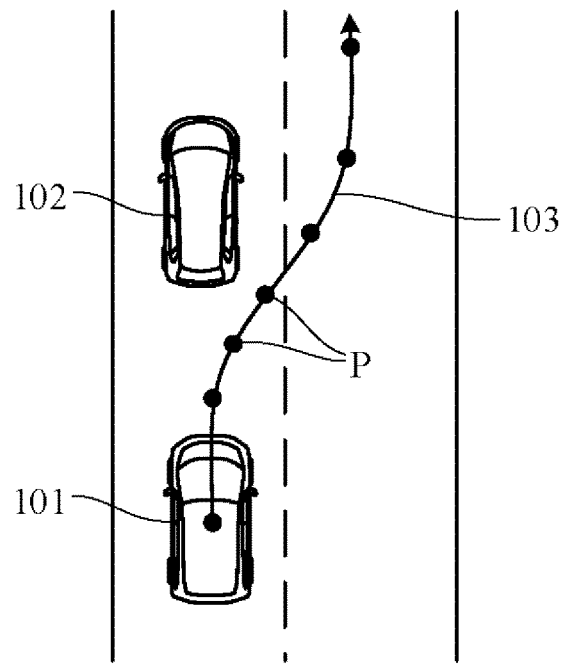
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a vehicle 102 ahead. Points P in FIG. 3 correspond to position data at every unit time Δt between present time point and predetermined time period T1 ahead. A target path 103 is obtained by connecting the points P in time order. The action plan generation unit 45 generates not only overtake action plans but also various other kinds of action plans for, inter alia, lane-changing to move from one traffic lane to another, lane-keeping to maintain same lane and not stray into another, and decelerating or accelerating.

When generating a target path, the action plan generation unit 45 first decides a drive mode and generates the target path in line with the drive mode. When creating an action plan for lane-keeping, for example, the action plan generation unit 45 firsts decides drive mode from among modes such as cruising, overtaking, decelerating, and curve negotiating. To cite particular cases, the action plan generation unit 45 decides cruising mode as drive mode when no other vehicle is present ahead of the subject vehicle (no forward vehicle) and decides following mode as drive mode when a vehicle ahead (forward vehicle) is present. In following mode, the action plan generation unit 45 generates, for example, travel plan data for suitably controlling inter-vehicle distance to a forward vehicle to target inter-vehicle distance in accordance with vehicle speed. The target inter-vehicle distance in accordance with vehicle speed is stored in the memory unit 42 in advance.

In self-drive mode, the driving control unit 46 controls the actuators AC to drive the subject vehicle 101 along target path 103 generated by the action plan generation unit 45. For example, the driving control unit 46 controls the throttle actuator 13, lockup actuator 23, shift actuator 24, brake actuator and steering actuator so as to drive the subject vehicle 101 through the points P of the unit times Δt in FIG. 3.

More specifically, in self-drive mode, the driving control unit 46 calculates acceleration (target acceleration) of sequential unit times Δt based on vehicle speed (target vehicle speed) at points P of sequential unit times Δt on target path 103 (FIG. 3) included in the action plan generated by the action plan generation unit 45. In addition, the driving control unit 46 calculates required driving force for achieving the target accelerations taking running resistance caused by road gradient and the like into account. And the actuators AC are feedback controlled to bring actual acceleration detected by the internal sensor group 32, for example, into coincidence with target acceleration. On the other hand, in manual drive mode, the driving control unit 46 controls the actuators AC in accordance with driving instructions by the driver (accelerator opening angle and the like) acquired from the internal sensor group 32.

Controlling of the transmission 3 by the driving control unit 46 is explained concretely. The driving control unit 46 controls shift operation (shifting) of the transmission 3 by outputting control signals to the shift actuator 24 using a shift map stored in the memory unit 42 in advance to serve as a shift operation reference.

Figure 4:
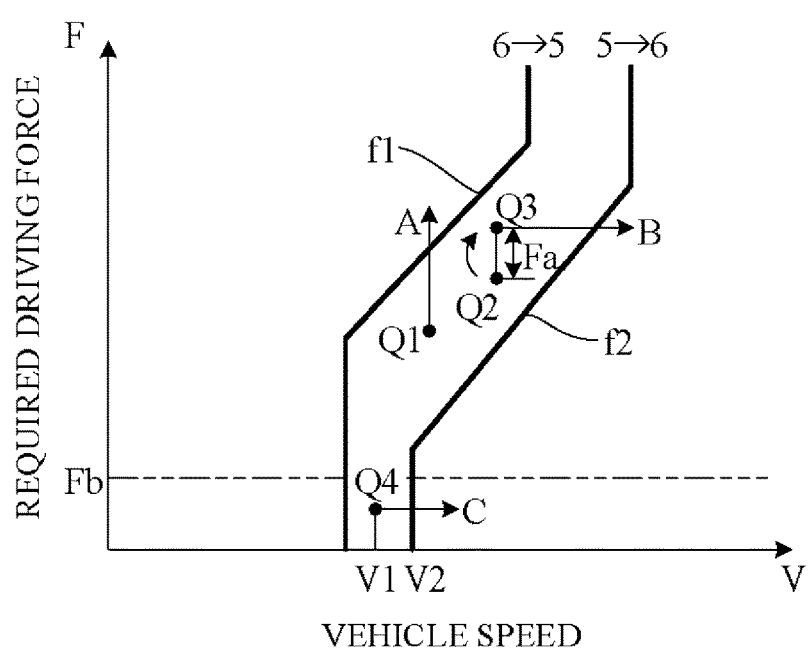
FIG. 4 is a diagram showing an example of a shift map stored in a memory unit of FIG. 2.

FIG. 4 is a diagram showing an example of the shift map stored in the memory unit 42, in particular, an example of the shift map corresponding to normal mode in self-drive mode. In the drawing, horizontal axis is scaled for vehicle speed V and vertical axis for required driving force F. Required driving force F is in one-to-one correspondence to accelerator opening angle which is an amount of operation of an accelerator (in self-drive mode, simulated accelerator opening angle) or throttle opening angle, and required driving force F increases with increasing accelerator opening angle or throttle opening angle. Therefore, the vertical axis can instead be scaled for accelerator opening angle or throttle opening angle.

In FIG. 4, characteristic curve f1 is an example of a downshift curve corresponding to downshift, for example, from sixth speed stage to fifth speed stage in self-drive mode and characteristic curve f2 is an example of an upshift curve corresponding to upshift, for example, from fifth speed stage to sixth speed stage in self-drive mode. Although not shown in the drawings regarding downshift and upshift of other speed stages, downshift curves and upshift curves are shifted to high vehicle speed side along with increase of speed stage, i.e., along with decrease of speed ratio. Downshift curves and upshift curves in sport mode are shifted to high vehicle speed side than downshift curves (characteristic curve f1) and upshift curves (characteristic curve f2) in normal mode. Therefore, timing of upshifting in sport mode is delay than timing of upshifting in normal mode, and timing of downshifting in sport mode is early than timing of downshifting in normal mode.

For example, considering downshift from operating point Q1 as shown in FIG. 4, in a case where required driving force F increases under constant vehicle speed V, the transmission 3 downshifts from sixth speed stage to fifth speed stage when operating point Q1 crosses downshift curve (characteristics f1) (arrow A). On the other hand, looking for example at upshift from operating point Q2, in a case where vehicle speed V increases under constant required driving force F, the transmission 3 upshifts from fifth speed stage to sixth speed stage when operating point Q3, obtained by adding predetermined excess driving force Fa to required driving force F at operating point Q2, crosses upshift curve (characteristics f2) (arrow B).

In other words, as regards upshift, upshift tendency of the transmission 3 is restrained by raising apparent required driving force F by excess driving force Fa and by delaying upshift timing than when excess driving force Fa is 0 (operating point Q2). As a result, busy shifting condition marked by frequent downshifting and upshifting, so called shift hunting, can be avoided. Excess driving force Fa can be either a fixed value or a variable value with vehicle speed or required driving force as a parameter.

In the so-configured vehicle travel control apparatus 100, the driving control unit 46 responds to performance of vehicle-following by calculating required driving force F so as to control inter-vehicle distance to forward vehicle (followed vehicle) to target inter-vehicle distance and feedback-controlling actuators AC to control actual acceleration detected by the internal sensor group 32 to target acceleration. By adding excess driving force Fa to required driving force F and thereby restricting upshift at this time, vehicle-following optimally matched to acceleration or deceleration of the forward vehicle can be realized while maintaining high acceleration response.

When the forward vehicle is cruising at constant or nearly constant speed, speed V of the subject vehicle following the forward vehicle in cruising (cruise mode) is also constant or nearly constant. Required driving force F necessary for such cruise-mode following is small and maximum value thereof is, for example, predetermined value Fb of FIG. 4. When operating point during following in cruise mode (cruise-mode following) at vehicle speed V1 is Q4, the transmission 3 is in fifth speed stage at operating point Q4 and upshifts from this state to sixth speed stage as indicated by arrow C in FIG. 4 when vehicle speed V increases to V2 or faster.

During cruise-mode following, only minimum required driving force equivalent to running resistance (e.g., required driving force of predetermined value Fb or less) is necessary, while no addition of excess driving force is required. Therefore, since it is possible to upshift to the high speed stage side than when upshifting in accordance with the normal shift map shown in FIG. 4, fuel economy performance and quietness are enhanced. So, as set forth in the following, the vehicle travel control apparatus 100 according to the present embodiment is configured to upshift the transmission 3 to highest gear speed stage possible when performing cruise-mode following.

Figure 5:
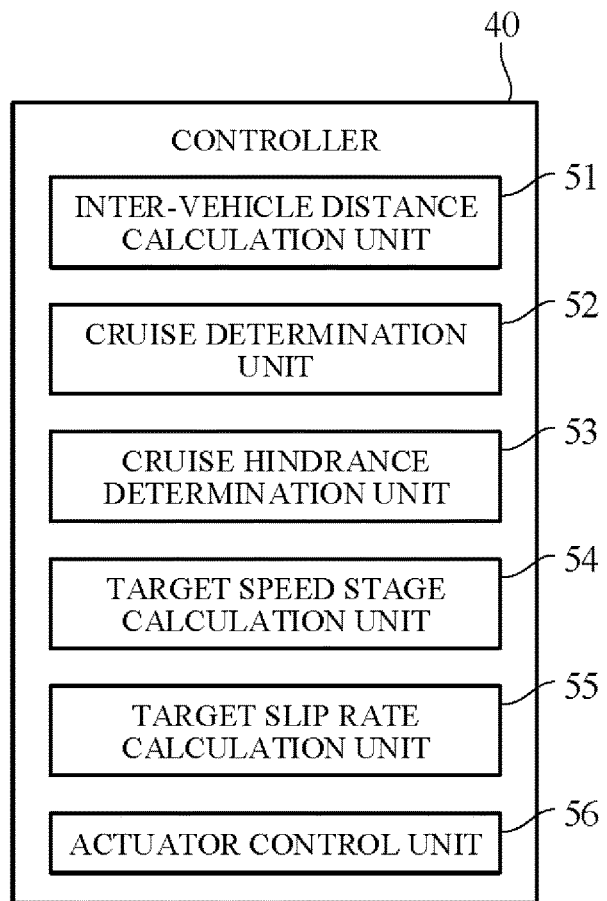
FIG. 5 is a block diagram illustrating main configuration of the vehicle travel control apparatus according to the embodiment of the present invention.

FIG. 5 is a block diagram showing main components of the vehicle travel control apparatus 100 according an embodiment of the present invention, particularly functional configurations of the controller 40 viewed from a different perspective from in FIG. 2. As shown in FIG. 5, the controller 40 includes an inter-vehicle distance calculation unit 51, a cruise determination unit 52, a cruise hindrance determination unit 53, a target speed stage calculation unit 54, a target slip rate calculation unit 55, and an actuator control unit 56. The inter-vehicle distance calculation unit 51 and cruise determination unit 52 are implemented by the exterior recognition unit 44 of FIG. 2, for example; the cruise hindrance determination unit 53 is implemented by the subject vehicle position recognition unit 43, for example; and the target speed stage calculation unit 54, target slip rate calculation unit 55 and actuator control unit 56 are implemented by the driving control unit 46, for example.

The inter-vehicle distance calculation unit 51 calculates actual inter-vehicle distance L between subject vehicle and a forward vehicle based on signals from the RADAR 312 and/or the camera 313.

The cruise determination unit 52 determines based on subject vehicle acceleration detected by the acceleration sensor 322 and actual inter-vehicle distance L calculated by the inter-vehicle distance calculation unit 51 whether magnitude (absolute value) of forward vehicle acceleration is equal to or less than predetermined value, i.e., whether the forward vehicle is cruising. More specifically, the cruise determination unit 52 first determines whether subject vehicle acceleration detected by the acceleration sensor 322 is equal to or less than predetermined value (e.g., predetermined acceleration corresponding to required driving force Fb of FIG. 4), i.e., whether the subject vehicle is cruising. When subject vehicle acceleration is determined to be equal to or less than predetermined value, the cruise determination unit 52 uses relationship between vehicle speed V and target inter-vehicle distance La stored in the memory unit 42 to calculate target inter-vehicle distance La corresponding to vehicle speed V detected by the vehicle speed sensor 321, and then calculates deviation between actual inter-vehicle distance L calculated by the inter-vehicle distance calculation unit 51 and target inter-vehicle distance La, i.e., distance deviation $\Delta L$ (=L−La).

Figure 6:
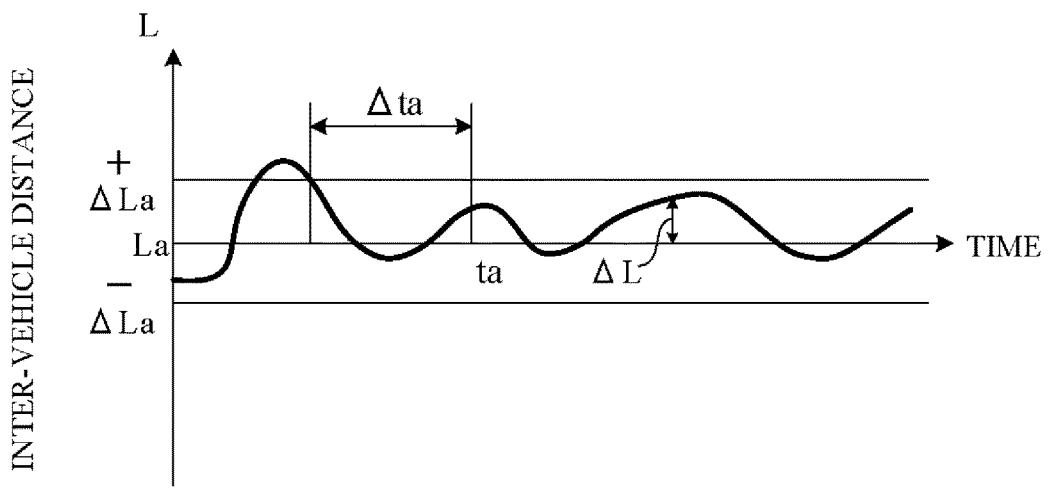
FIG. 6 is a diagram showing an example of time-course change of an actual inter-vehicle distance with respect to a target inter-vehicle distance.

FIG. 6 is a diagram showing an example of time-course change of actual inter-vehicle distance L with respect to target inter-vehicle distance La. In the example of FIG. 6, actual inter-vehicle distance L varies with respect to target inter-vehicle distance La by positive deviation $\Delta L$ (L>La) or negative deviation $\Delta L$ (L<La). When subject vehicle acceleration is equal to or less than predetermined value (e.g., value corresponding to required driving force Fb of FIG. 4), the cruise determination unit 52 determines whether state of absolute value of deviation $\Delta L$ falling within predetermined value $\Delta La$ (e.g., 5% of target inter-vehicle distance La) continues for predetermined time period $\Delta ta$ or longer, and when such state is determined to continue for predetermined time period $\Delta ta$ or longer (at time to of FIG. 6), the forward vehicle is determined to be cruising. Alternatively, ratio of actual inter-vehicle distance L to target inter-vehicle distance La (L/La) can be designated "follow ratio", and forward vehicle can be determined to be "cruising" when follow ratio remains within predetermined range (e.g., 95% to 105%) for predetermined time period $\Delta ta$ or longer while subject vehicle acceleration stays equal to or less than predetermined value (e.g., value corresponding to required driving force Fb of FIG. 4).

Figure 7:
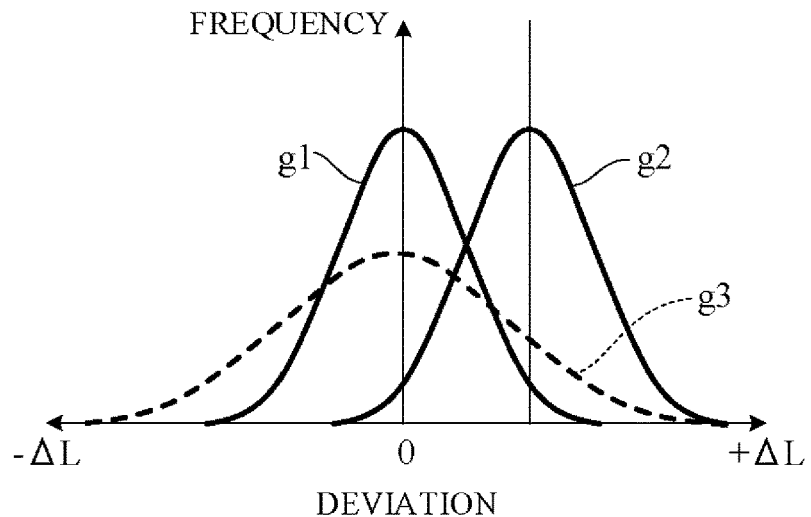
FIG. 7 is a diagram showing examples of normal distribution of frequency of a distance deviation between the actual inter-vehicle distance and the target inter-vehicle distance.

Optionally, where frequency of deviation $\Delta L$ between actual inter-vehicle distance L and target inter-vehicle distance La is expressed in normal distribution, the cruise determination unit 52 can determine whether the forward vehicle is cruising based on mean value and dispersion value of normal distribution. FIG. 7 is a diagram showing examples of normal distribution of distance deviation $\Delta L$ frequency. Normal distribution curve g1 is an example in which mean distance deviation $\Delta L$ is 0, and normal distribution curve g2 is an example in which mean distance deviation $\Delta L$ is +$\Delta L1$. Curve g3 (dotted line) is an example of a normal distribution curve whose mean distance deviation $\Delta L$ is 0 and whose dispersion value is larger than that of normal distribution curve g1.

The cruise determination unit 52 determines that the forward vehicle is cruising when (a) subject vehicle acceleration is equal to or less than predetermined value, (b) magnitude of mean value of distance deviation $\Delta L$ (absolute value) is equal to or less than predetermined value (e.g., 0 as indicated in normal distribution curve g1), and (c) dispersion value is small (e.g., standard deviation $\sigma$ is equal to or less than predetermined value). On the other hand, when frequency of acceleration delay with respect of forward vehicle is high, mean value of distance deviation $\Delta L$ shifts to positive side (side of increased inter-vehicle distance L) as indicated in normal distribution curve g2, in which case the cruise determination unit 52 determines that the forward vehicle is not cruising. And when frequencies of acceleration delay and deceleration delay with respect of forward vehicle are high, dispersion is great as indicated in normal distribution curve g3, in which case also, the cruise determination unit 52 determines that the forward vehicle is not cruising.

Alternatively, the cruise determination unit 52 can calculate magnitude (absolute value) of mean value of forward vehicle acceleration and determine whether the forward vehicle is cruising based on the calculated mean value. Acceleration of the forward vehicle can be calculated, for example, by first obtaining acceleration of forward vehicle relative to subject vehicle by calculating second derivative with respect to time of actual inter-vehicle distance L calculated by the inter-vehicle distance calculation unit 51 and then adding subject vehicle acceleration detected by the acceleration sensor 322 to this relative acceleration.

Figure 8A:
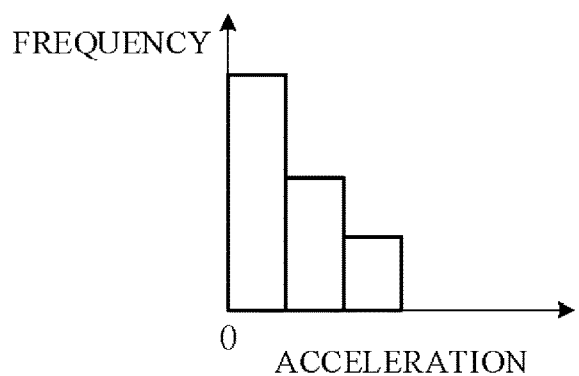
FIG. 8A is a histogram showing an example of a frequency distribution of an acceleration magnitude of a forward vehicle.
Figure 8B:
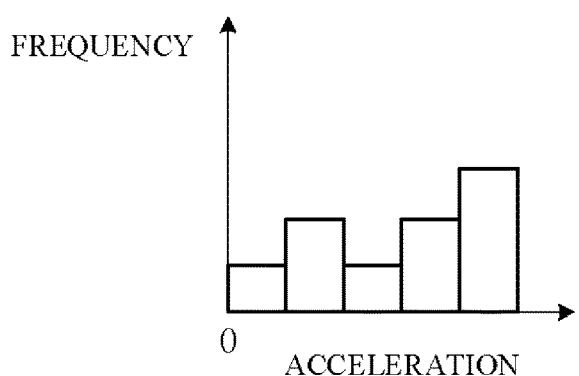
FIG. 8B is a histogram showing another example of a frequency distribution of an acceleration magnitude of a forward vehicle.

FIGS. 8A and 8B are histograms showing frequency (count) dispersion of acceleration magnitude of forward vehicle. The cruise determination unit 52 calculates an acceleration magnitude mean value from each of these histograms and determines that the forward vehicle is cruising when calculated mean value is equal to or less than predetermined value. The histogram of FIG. 8A is an example wherein mean value is equal to or less than predetermined value, in which case the cruise determination unit 52 determines that the forward vehicle is cruising. The histogram of FIG. 8B is an example wherein mean value is greater than predetermined value, in which case the cruise determination unit 52 determines that the forward vehicle is not cruising.

When the cruise determination unit 52 determines that the forward vehicle is cruising, the cruise hindrance determination unit 53 determines whether data of the travel route extending from current time to predetermined time period T (e.g., 5 sec) onward include road data posing hindrance to cruising. In making this determination, the cruise hindrance determination unit 53 first acquires subject vehicle surrounding road data. Specifically, it utilizes subject vehicle position data obtained by the GPS unit 34, map data from the map database 35 and target route set in the navigation unit 36 to acquire and recognize subject vehicle map position and data on road ahead (uphill road, curved road or other type road).

Next, the cruise hindrance determination unit 53 determines based on recognized road condition whether travel route data from current time to predetermined time period onward include uphill road, curved road or other road data posing hindrance to cruising. This determination is made in light of the fact that on an uphill road of predetermined slope angle or greater or on a curved road of predetermined curvature or greater required driving force necessary for performing vehicle-following increases to the point of making cruising at required driving force of or less than predetermined value Fb (FIG. 4) impossible to continue. In this case, the cruise hindrance determination unit 53 determines that travel route data include road data posing hindrance to cruising.

Figure 9:
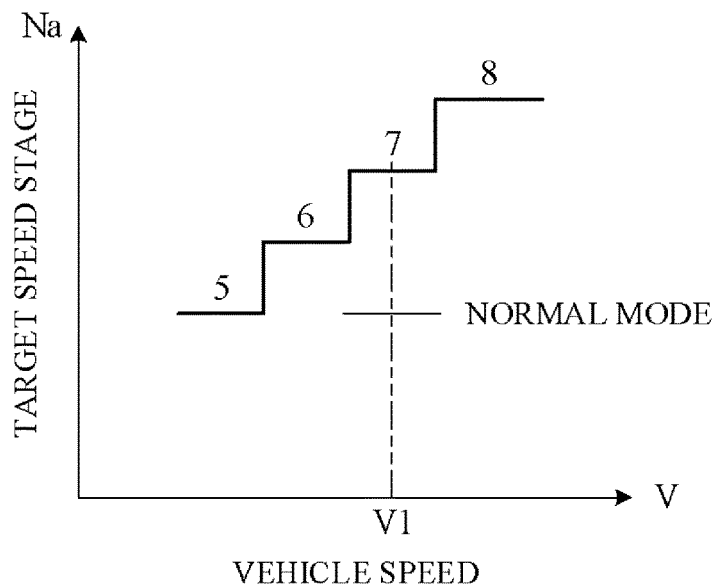
FIG. 9 is a diagram showing an example of relationship between a vehicle speed and a target speed stage when the forward vehicle is cruising.

The target speed stage calculation unit 54 is responsive to determination of cruising state by the cruise determination unit 52 and determination by the cruise hindrance determination unit 53 of road data not including data posing hindrance to cruising, for calculating target speed stage Na based on characteristic curve of FIG. 9 stored in the memory unit 42. FIG. 9 is a diagram showing an example of relationship between vehicle speed V and target speed stage Na during cruise-mode following, i.e., a cruise-mode shift curve. According to the cruise-mode shift curve shown in FIG. 9, target speed stage Na rises stepwise with increasing vehicle speed V. Target speed stage Na is set farther to high speed stage side than speed stage defined by a normal shift map (normal mode speed stage; FIG. 4). For example, during cruising at vehicle speed V1, speed stage is fifth speed stage according the normal shift map, but is seventh speed stage according to the cruise-mode shift curve of FIG. 9.

Target speed stage Na according to the characteristic curve of FIG. 9 is the lowest speed stage among speed stages at which engine speed Ne becomes lower than predefined misfire speed Nea of the engine 1. For example, when engine speed Ne during cruising becomes misfire speed Nea at speed ratio between N stage and N+1 stage, target speed stage Na is N+1 stage. More specifically, during cruising at vehicle speed V1, when engine speed Ne becomes misfire speed Nea at higher than seventh speed stage (e.g., at speed ratio between sixth stage and seventh stage), target speed stage Na is seventh speed stage.

The target slip rate calculation unit 55 calculates target slip rate of the lockup clutch 21 during cruise-mode following. At this time, it first calculates target rotational speed Nia of the input shaft of the transmission 3 (target rotational speed of the turbine runner of the torque converter 2) necessary for performing cruise-mode vehicle-following in target speed stage Na calculated by the target speed stage calculation unit 54. Target rotational speed Nia is, for example, lower than misfire speed Nea of the engine 1. Next, as target slip rate, the target slip rate calculation unit 55 calculates slip rate of the lockup clutch 21 when the engine 1 is rotated at minimum target rotational speed (engine target speed Neb) higher than misfire speed Nea by predetermined rotational speed, i.e., slip rate for enabling rotational speed Ni of the input shaft of the transmission 3 to achieve target rotational speed Nia when the engine 1 rotates at engine target speed Neb. Slip rate is ratio between engine speed Ne (pump impeller rotational speed) and rotational speed Ni of the input shaft of the transmission 3 (turbine runner rotational speed).

The actuator control unit 56 outputs a control signal to the shift actuator 24 so as to shift speed stage of the transmission 3 to target speed stage Na calculated by the target speed stage calculation unit 54. It also outputs control signals to the throttle actuator 13 and the injectors 12 in order to control engine speed to engine target speed Neb calculated by the target slip rate calculation unit 55. In addition, it outputs a control signal to the lockup actuator 23 to control slip rate of the lockup clutch 21 to target slip rate calculated by the target slip rate calculation unit 55.

Figure 10:
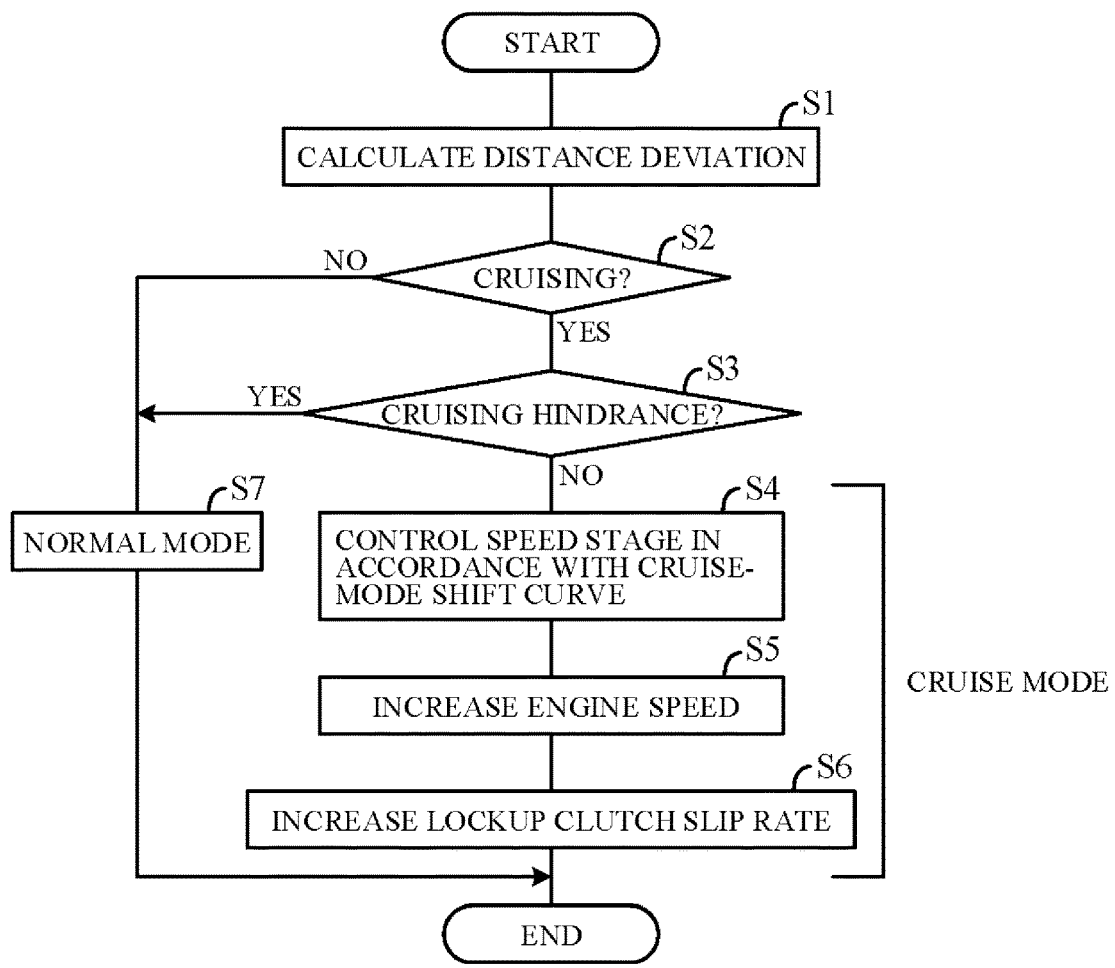
FIG. 10 is a flow chart showing an example of processing performed by a controller of FIG. 5.

FIG. 10 is a flowchart showing an example of processing performed by the controller 40 in accordance with a program stored in the memory unit 42 (FIG. 2) in advance. The processing shown in this flowchart is started when driving in self-drive mode is instructed by, for example, switching of the self/manual drive select switch 331 and is repeated periodically at predetermined intervals.

First, in S1 (S: processing Step), distance deviation ΔL between actual inter-vehicle distance L calculated by the inter-vehicle distance calculation unit 51 and target inter-vehicle distance La is calculated. Next, in S2, the cruise determination unit 52 determines based on subject vehicle acceleration detected by the acceleration sensor 322 and distance deviation ΔL calculated in S1 whether forward vehicle is cruising. More specifically, whether state of deviation ΔL staying equal to or less than predetermined value ΔLa under subject vehicle acceleration of or less than predetermined value continues for predetermined time period Δta is determined.

Alternatively, instead of determining whether state of distance deviation ΔL staying equal to or less than predetermined value ΔLa continues for predetermined time period Δta, it is possible to determine whether magnitude (absolute value) of distance deviation ΔL mean value is equal to or less than predetermined value (e.g., 0 as indicated in normal distribution curve g1) and dispersion value is equal to or less than predetermined value (e.g., standard deviation σ is equal to or less than predetermined value). It is also alternatively possible to determine from mean value of magnitude (absolute value) of acceleration of the forward vehicle whether the forward vehicle is cruising. In such case, forward vehicle acceleration can be calculated by first calculating acceleration of forward vehicle relative to subject vehicle by calculating second derivative with respect to time of actual inter-vehicle distance L calculated by the inter-vehicle distance calculation unit 51 and then adding subject vehicle acceleration detected by the acceleration sensor 322 to the relative acceleration.

If a positive decision is made in S2, the routine proceeds to S3, and if a negative decision is made, proceeds to S7. In S3, the cruise hindrance determination unit 53 determines based on signals from the GPS unit 34, map database 35 and navigation unit 36 whether travel route data from current time to predetermined time period T onward include road data posing hindrance to cruising. Specifically, the cruise hindrance determination unit 53 determines whether uphill road of predetermined slope angle or greater, curved road of predetermined curvature or greater, or similar conditions lie ahead. If a positive decision is made in S3, the routine proceeds to S7, and if a negative decision is made, proceeds to S4. Thus when the forward vehicle is determined in S2 to be cruising, and relevant road data are determined in S3 not to include data posing hindrance to cruising, the routine proceeds to S4 to assume cruise mode.

In S4 to S6, processing for driving the subject vehicle in cruise mode is performed. In S4, the target speed stage calculation unit 54 uses the cruise-mode shift curve (FIG. 9) stored in the memory unit 42 in advance to calculate target speed stage Na appropriate for vehicle speed V. Also in S4, the actuator control unit 56 outputs a control signal to the shift actuator 24 so as to control speed stage of the transmission 3 to target speed stage Na. Target speed stage Na is a speed stage set farther to high speed stage side than normally, and in S4 the transmission 3 is, for example, shifted up.

Next, in S5, the actuator control unit 56 increase engine speed Ne by outputting control signals to the throttle actuator 13 and injectors 12. Specifically, it increases engine speed Ne to engine target speed Neb higher than misfire speed Nea.

Next, in S6, the target slip rate calculation unit 55 calculates target rotational speed Nia of the input shaft of the transmission 3 corresponding to target speed stage Na calculated in S4 and further calculates target slip rate for avoiding vehicle speed increase owing to engine speed Ne increase, i.e., target slip rate for enabling rotational speed Ni of the input shaft of the transmission 3 to achieve target rotational speed Nia. Also in S6, the actuator control unit 56 outputs a control signal to the lockup actuator 23 so as to control slip rate of the lockup clutch 21 to target slip rate. As a result, the lockup clutch 21 (LC) is controlled to clutch OFF side, whereby slip rate (slippage) increases.

In S7, on the other hand, driving actions are controlled in normal mode rather than cruise mode. In this case, the actuator control unit 56 outputs a control signal to the shift actuator 24 to control speed stage in accordance with the normal shift map (FIG. 4) to low speed stage side relative to during cruise-mode following. Moreover, the actuator control unit 56 outputs a control signal to the throttle actuator 13 so as to obtain required driving force requested by the driving control unit 46. In addition, the actuator control unit 56 outputs a control signal to the lockup actuator 23 so as to reduce slip rate of the lockup clutch 21 relative to that during cruise-mode following (e.g., to lockup ON state).

Figure 11:
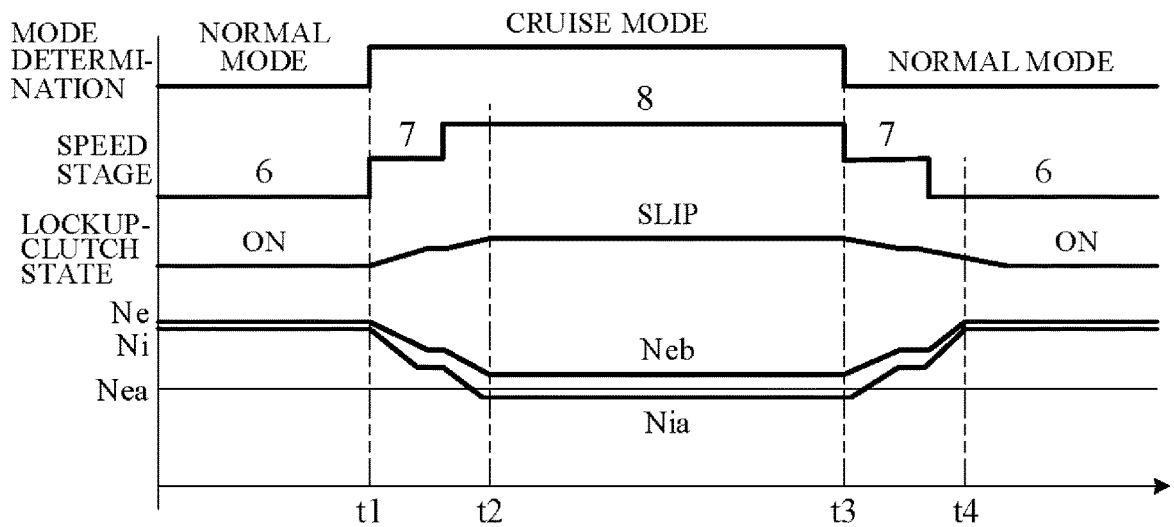
FIG. 11 is a time chart showing an example of operation by the vehicle travel control apparatus according to the embodiment of the present invention.

Operation of the vehicle travel control apparatus 100 according to the present embodiment is concretely explained in the following. FIG. 11 is a time chart showing an example of how driving state changes over time. As shown in FIG. 11, in initial state up to time t1, the forward vehicle is assumed not to be cruising. Driving actions of the subject vehicle running in self-drive mode are therefore controlled in normal mode (S7). In such case, speed stage is, for example, sixth speed stage, and the lockup clutch 21 is, for example, in clutch ON state. Engine speed Ne and rotational speed Ni of the input shaft of the transmission 3 are therefore the same (Ne=Ni).

Upon determination at time t1 that travel route data from current time to predetermined time period T onward contain no road data posing hindrance to cruising and that forward vehicle is cruising, the transmission 3 is sequentially upshifted to seventh speed stage and eighth speed stage in accordance with a predefined cruise-mode shift curve (FIG. 9) (S4). Although this upshifting reduces engine speed Ne, the amount of the reduction is minimized by suitably controlling the throttle actuator 13 and injectors 12 to achieve engine speed Ne of minimum speed Neb higher than misfire speed Nea at time t2 (S5). While engine speed Ne is being controlled to higher rotational speed than misfire speed Nea, the lockup clutch 21 is controlled to slip side, whereby rotational speed Ni of the input shaft of the transmission 3 is controlled to target rotational speed Nia lower than misfire speed Nea (S6).

If the processing of S5 is omitted, the processing of S6 is unnecessary. But in such case the engine 1 is apt to misfire owing to engine speed Ne falling below misfire speed Nea during upshift. So when this method is adopted, misfiring of the engine 1 is prevented by limiting upshift to lower speed stage side (e.g., limiting upshift to seventh speed stage) and prohibiting upshift to eighth speed stage.

Thus, in cruise mode, speed stage is upshifted up to a speed stage not used in normal mode. Specifically, the transmission 3 is upshifted until rotational speed Ni of the input shaft of the transmission 3 becomes target rotational speed Nia lower than misfire speed Nea of the engine 1. Excess driving force at this time is, for example, 0, so that acceleration is impossible. Fuel efficiency is therefore maximally enhanced. Moreover, misfire is inhibited because engine speed Ne is higher than misfire speed Nea, and the subject vehicle cruises at predetermined speed because the lockup clutch 21 slips. Owing to the slipping of the lockup clutch 21 in this manner, booming noise and/or vehicle vibration due to engine torque vibration can be suppressed and vehicle quietness enhanced.

When the forward vehicle is thereafter determined not to be cruising at time t3, driving mode is switched to normal mode and the transmission 3 is sequentially downshifted to seventh speed stage and sixth speed stage. Engine speed Ne increases as a result. Slippage of the lockup clutch 21 is reduced at this time by controlling the lockup clutch 21 to engagement side (e.g., putting it in clutch ON state).

The vehicle travel control apparatus 100 according to the present embodiment can achieve advantages and effects such as the following:

(1) The vehicle travel control apparatus 100 according to the present embodiment is configured to control the engine 1, transmission 3, lockup clutch 21 and other members contributing to the subject vehicle 101 traveling behavior so that the subject vehicle 101 incorporating autonomous driving capability performs vehicle-following of the forward vehicle 102. The vehicle travel control apparatus 100 includes: the RADAR 312, camera 313 and other inter-vehicle distance detectors for detecting traveling state (e.g., inter-vehicle distance L) of the forward vehicle 102; the cruise determination unit 52 for determining based on traveling state detected by the inter-vehicle distance detectors whether the forward vehicle 102 is cruising; and the actuator control unit 56 responsive to determination by the cruise determination unit 52 that the forward vehicle 102 is cruising, for controlling the engine 1 (throttle actuator 13), transmission 3 (shift actuator 24) and lockup clutch 21 (lockup actuator 23) to perform vehicle-following of the forward vehicle 102 in cruise mode with higher priority on fuel economy performance and quietness than when the cruise determination unit 52 determines that the forward vehicle 102 is not cruising (FIG. 5). Since the engine 1, transmission 3 and lockup clutch 21 are thus controlled in cruise mode different from normal mode when the forward vehicle 102 is determined to be cruising, fuel efficiency and quietness can be maximally enhanced.

(2) The actuator control unit 56 is responsive to determination by the cruise determination unit 52 that the forward vehicle 102 is cruising, for controlling the transmission 3 so as to upshift speed stage farther to high speed stage side (in other words, so as to decrease speed ratio of the transmission 3) when the cruise determination unit 52 determines that the forward vehicle 102 is cruising than when the cruise determination unit 52 determines that the forward vehicle 102 is not cruising. Since this results in decreased engine speed and causes excess driving force to become 0, for example, fuel economy performance and low-noise performance can be enhanced.

(3) The actuator control unit 56 is responsive to determination by the cruise determination unit 52 that the forward vehicle 102 is cruising, for controlling the lockup clutch 21 to greater slip rate than when the cruise determination unit 52 determines that the forward vehicle 102 is not cruising. Since this inhibits booming noise and vehicle vibration attributable to engine torque vibration, fuel economy performance and low-noise performance can be simultaneously improved.

(4) The actuator control unit 56 is responsive to determination by the cruise determination unit 52 that the forward vehicle 102 is cruising, for controlling the transmission 3, engine 1 and lockup clutch 21 in order to upshift the transmission 3, increase rotational speed of the engine 1, and increase slip rate of the lockup clutch 21, respectively. Therefore, since engine speed Ne does not fall to or below misfire speed Nea even if the transmission 3 is upshifted to a speed stage farther to high speed stage side than during normal mode, the transmission 3 can be maximally upshifted. Moreover, since slip rate of the lockup clutch 21 increases in proportion as engine speed Ne increases, vehicle quietness is further improved.

(5) The vehicle travel control apparatus 100 further includes the GPS unit 34, the map database 35 and the navigation unit 36 that acquire subject vehicle surrounding road data, and the cruise hindrance determination unit 53 for determining based on acquired road data whether travel route data from current time to predetermined time period T onward include curved road, uphill road or other road data posing hindrance to cruising (FIGS. 2 and 5). The actuator control unit 56 switches driving mode to cruise mode on condition that the cruise hindrance determination unit 53 determines that no road data posing hindrance to cruising are present. Therefore, the subject vehicle transitions to cruise mode when the forward vehicle can be expected to continue cruising, and frequent mode switching between cruise mode and normal mode can be avoided. Since this reduces frequency of upshifting and downshifting, passenger riding comfort improves.

In this connection, when the forward vehicle being followed is a self-driving vehicle, vehicle speed of the forward vehicle is automatically controlled to target vehicle speed. Such a self-driving vehicle travels at steadier speed than a manually driven vehicle that travels in response to operations by a driver. So if whether the forward vehicle is a self-driving vehicle can be ascertained, i.e., if whether the forward vehicle is traveling in self-drive mode can be ascertained, the subject vehicle can achieve efficient following of the forward vehicle. With attention to this point, the present embodiment is configured as set out in the following to include a drive-mode recognition apparatus (drive-mode recognition unit).

Figure 12:
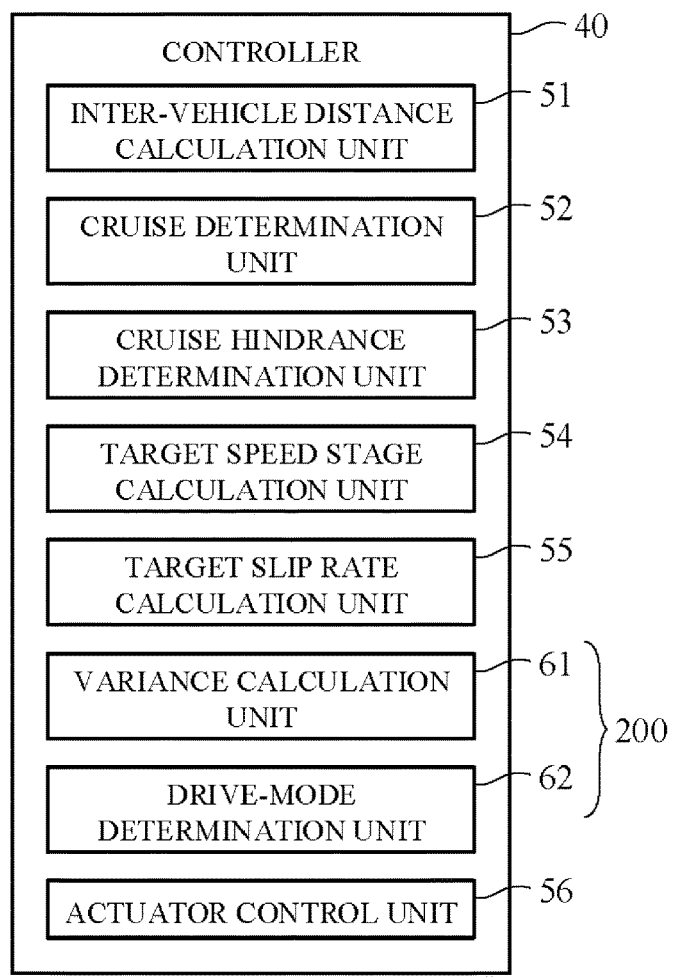
FIG. 12 is a block diagram illustrating main configuration of the vehicle travel control apparatus including a drive-mode recognition unit according to the embodiment of the present invention.

FIG. 12 is a block diagram showing main components of a vehicle travel control apparatus including a drive-mode recognition unit 200 according to the embodiment of the present invention. The drive-mode recognition unit 200 constitutes one part of the vehicle travel control apparatus 100 (FIG. 2) according to the present embodiment and is shown as a modification of the controller 40 of FIG. 5. In FIG. 12, members in common with those of FIG. 5 are assigned like reference symbols and the ensuing explanation is focused mainly on points of difference from FIG. 5.

As shown in FIG. 12, the controller 40 includes the inter-vehicle distance calculation unit 51, the cruise determination unit 52, the cruise hindrance determination unit 53, the target speed stage calculation unit 54, the target slip rate calculation unit 55, a variance calculation unit 61, a drive-mode determination unit 62, and the actuator control unit 56. The drive-mode recognition unit 200 includes the variance calculation unit 61 and the drive-mode determination unit 62. The variance calculation unit 61 and drive-mode determination unit 62 are, for example, implemented by the driving control unit 46.

Figure 13:
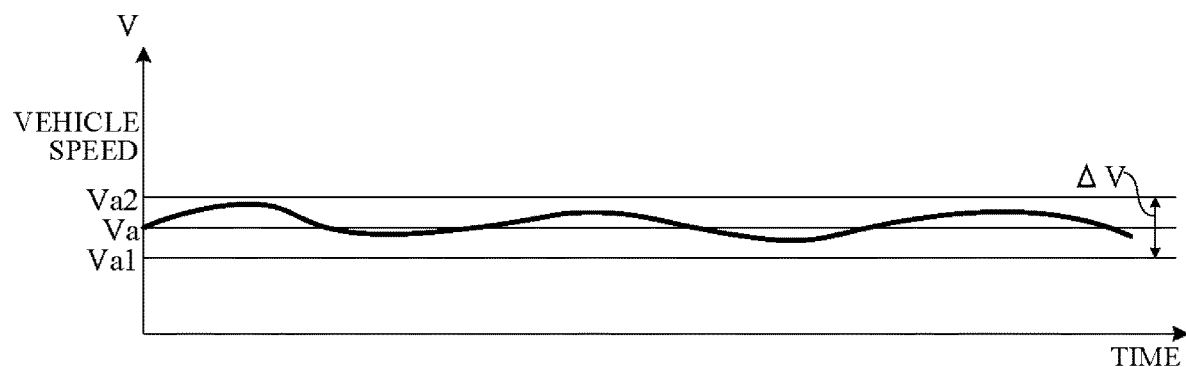
FIG. 13 is a time chart showing an example of time-course variance of vehicle speed of the forward vehicle over time when the forward vehicle is traveling in self-drive mode.

The variance calculation unit 61 uses change of inter-vehicle distance L calculated by the inter-vehicle distance calculation unit 51 to calculate degree of variance of vehicle speed or acceleration of the forward vehicle. FIG. 13 is a time chart showing an example of time-course variance of vehicle speed V of the forward vehicle over time when the forward vehicle is traveling in self-drive mode. Vehicle speed V of the forward vehicle is calculated by time-differentiating inter-vehicle distance L calculated by the inter-vehicle distance calculation unit 51 to obtain relative vehicle speed and adding subject vehicle speed detected by the vehicle speed sensor 321 to the calculated relative vehicle speed.

When the forward vehicle travels in self-drive mode its vehicle speed V is accurately controlled to target vehicle speed Va. Therefore, as shown in FIG. 13, vehicle speed V of the forward vehicle falls within a certain vehicle speed range ΔV centered on target vehicle speed Va and lying between a certain lower limit vehicle speed Va1 and a certain upper limit vehicle speed Va2. The variance calculation unit 61 can express degree of variance of vehicle speed V as a numerical value. For example, variance is considered to be of minimum degree (e.g., 0) when vehicle speed V falls within certain vehicle speed range ΔV and to increase progressively in degree as vehicle speed V exceeds and grows larger beyond certain vehicle speed range ΔV.

Figure 14:
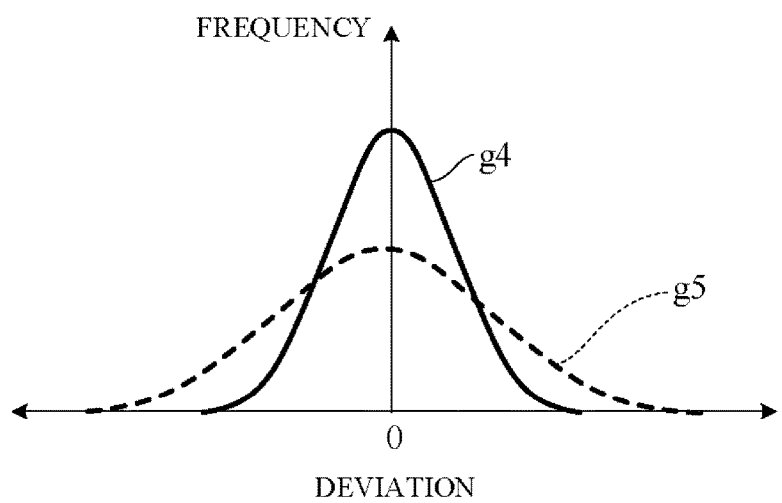
FIG. 14 is a diagram showing examples of variance of vehicle speed of the forward vehicle expressed in a normal distribution.

Optionally, where variance of vehicle speed V of the forward vehicle is expressed in normal distribution, the variance calculation unit 61 can calculate degree of variance in accordance with dispersion value of the normal distribution. FIG. 14 is a diagram showing examples of variance of vehicle speed V of the forward vehicle expressed in normal distribution. FIG. 14 shows two different normal distribution curves, i.e., normal distribution curve g4 (solid line) and normal distribution curve g5 (dotted line). Dispersion value (σ) of normal distribution curve g4 is smaller than that of normal distribution curve g5 and its variance is therefore smaller. Degree of variance of vehicle speed V of the forward vehicle can thus be obtained in terms of dispersion value of normal distribution.

Alternatively, when frequency of deviation ΔL between actual inter-vehicle distance L and target inter-vehicle distance La under condition of subject vehicle acceleration equal to or less than predetermined value (e.g., value corresponding to required driving force Fb of FIG. 4) is expressed in normal distribution (as in FIG. 7, for example), the variance calculation unit 61 can calculate degree of variance based on mean value and dispersion value of normal distribution. Specifically, when mean value is 0 and dispersion value is small, as indicated by normal distribution curve g1 of FIG. 7, degree of variance can be defined as small, and when mean value is apart from 0, as indicated by normal distribution curve g2, or dispersion value is large, as indicated by normal distribution curve g3, degree of variance can be defined as large.

When degree of variance of vehicle speed V of the forward vehicle calculated by the variance calculation unit 61 is equal to or less than predetermined value, e.g., when, as shown in FIG. 13, change rate of vehicle speed is within certain range ΔV of vehicle speed and degree of variance is 0, the drive-mode determination unit 62 determines that the forward vehicle is traveling in self-drive mode. On the other hand, when degree of variance calculated by the variance calculation unit 61 is large than a predetermined value, the drive-mode determination unit 62 determines that the forward vehicle is traveling in manual drive mode.

The drive-mode determination unit 62 can use degree of variance calculated by the variance calculation unit 61 and subject vehicle surrounding road data acquired from the GPS unit 34, map database 35 and navigation unit 36 to determine in which of self-drive mode and manual drive mode the forward vehicle is traveling.

For example, when the forward vehicle travels in manual drive mode on a gradually ascending road of such gentle gradient that the driver is not conscious of the slope, forward vehicle speed V is apt to fall below lower limit vehicle speed Va1 (FIG. 13). Forward vehicle speed V is also apt to fall below lower limit vehicle speed Va1 when the driver is slow in depressing the accelerator pedal when traveling on a steep uphill road of large gradient angle. In contrast, when the forward vehicle travels in self-drive mode, vehicle speed V is prevented from falling below lower limit vehicle speed Va1 because a vehicle travel control apparatus installed in the forward vehicle instantly detects change in vehicle speed V caused by change in road gradient. Moreover, vehicle speed V is also prevented from falling below lower limit vehicle speed Va1 in a case of running on an uphill road of large gradient angle because vehicle driving force is increased in accordance with change in gradient.

A pronounced difference is thus observed between manual driving and self-driving depending on road conditions. Optionally, therefore, the drive-mode determination unit 62 can ascertain degree of variance in the light of road data acquired from the GPS unit 34, map database 35, navigation unit 36 and other road data acquisition members. So in the case of road data corresponding to certain conditions in the road ahead, such as presence of steep inclines, gradual inclines or the like, for example, whether the forward vehicle is in manual drive mode or self-drive mode can be determined accordingly. This enables determination of whether the forward vehicle travels in manual drive mode or self-drive mode to be performed with good accuracy. The drive-mode determination unit 62 can likewise be adapted to determine whether the forward vehicle is in manual drive mode or self-drive mode not only when the road ahead is a sloped road but also when it is a curved road.

The actuator control unit 56 is responsive to determination by the cruise determination unit 52 that the forward vehicle 102 is cruising and determination by the drive-mode determination unit 62 that the forward vehicle is traveling in self-drive mode, for controlling the engine 1, transmission 3 and lockup clutch 21 in cruise mode as driving mode similarly to as explained above. In contrast, even when the cruise determination unit 52 determines that the forward vehicle is cruising, when the drive-mode determination unit 62 determines that the forward vehicle is traveling in manual drive mode, and even if the forward vehicle is determined to be traveling in self-drive mode but the forward vehicle is determined not to be cruising, the actuator control unit 56 controls the engine 1, transmission 3 and lockup clutch 21 in normal mode as driving mode similarly to as explained above.

Therefore, when the forward vehicle is travel in self-drive mode, the speed stage of the transmission 3 is controlled farther to high speed stage side and the lockup clutch 21 farther to slip side than when the forward vehicle is traveling in manual drive mode. Optionally, solely control of speed stage to high speed stage side can be performed without changing slip state of the lockup clutch. Optionally, predetermined time period Δta for determining cruising (FIG. 6) can be set shorter when the forward vehicle is determined to be traveling in self-drive mode than when it is determined to be traveling in manual drive mode. When the forward vehicle is determined to be traveling in self-drive mode, it can be expected to cruise accurately irrespective of road condition. In such case, therefore, subject vehicle can optionally be allowed to cruise irrespective of what is determined by the cruise hindrance determination unit 53.

Figure 15:
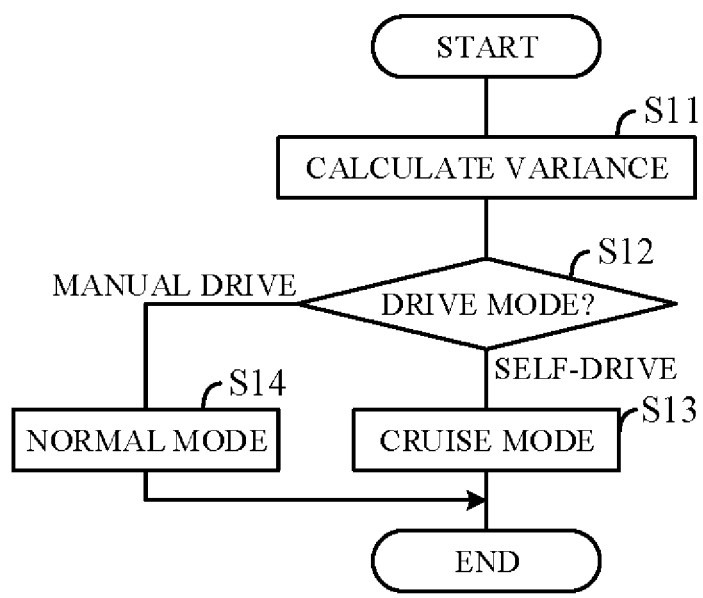
FIG. 15 is a flow chart showing an example of processing performed by a controller of FIG. 12.

FIG. 15 is a flowchart showing an example of processing performed by the controller 40 of FIG. 12. The processing shown in this flowchart is started when driving in self-drive mode is instructed by, for example, switching of the self/manual drive select switch 331 and is repeated periodically at predetermined intervals.

First, in S11, the variance calculation unit 61 uses change of inter-vehicle distance L calculated by the inter-vehicle distance calculation unit 51 to calculate degree of variance of vehicle speed or acceleration of the forward vehicle. Next, in S12, the drive-mode determination unit 62 uses degree of variance of vehicle speed or acceleration of the forward vehicle calculated by the variance calculation unit 61 to determine in which of self-drive mode and manual drive mode the forward vehicle is traveling. When traveling in self-drive mode is determined in S12, the routine proceeds to S13 to control subject vehicle driving actions in cruise mode similarly to in S4 to S6 of FIG. 10. On the other hand, when traveling in manual drive mode is determined in S12, the routine proceeds to S14 to control subject vehicle driving actions in normal mode similarly to in S7 of FIG. 10.

The vehicle travel control apparatus 100 according to the present embodiment can further achieve advantages and effects such as the following:

(1) The vehicle travel control apparatus 100 according to the present embodiment includes: the RADAR 312, camera 313 and other inter-vehicle distance detectors for detecting traveling state (e.g., inter-vehicle distance L) of the forward vehicle 102; and the drive-mode recognition unit 200 for recognizing, based on traveling state detected by the inter-vehicle distance detectors, traveling state of the forward vehicle 102 traveling ahead of the subject vehicle 101 incorporating autonomous driving capability (FIG. 12). The drive-mode recognition unit 200 includes: the variance calculation unit 61 for calculating, based on traveling state detected by the inter-vehicle distance detectors, degree of variance of vehicle speed or acceleration of the forward vehicle 102; and the drive-mode determination unit 62 for determining, based on degree of variance calculated by the variance calculation unit 61, in which of self-drive mode and manual drive mode the forward vehicle 102 is traveling (FIG. 12). Since this enables recognition of whether driving mode of the forward vehicle 102 is self-drive mode or manual drive mode, the subject vehicle 101 controlled with respect to the forward vehicle 102 can travel efficiently.

(2) The vehicle travel control apparatus 100 further includes the actuator control unit 56 for controlling the engine 1, transmission 3 and lockup clutch 21 of the subject vehicle 101 so that the subject vehicle 101 performs vehicle-following of the forward vehicle 102 (FIG. 12). When the drive-mode determination unit 62 determines that the forward vehicle 102 is traveling in self-drive mode, the actuator control unit 56 controls the transmission 3 so as, for example, to upshift the transmission 3 to a speed stage farther to high speed stage side than the when the forward vehicle 102 is determined to be traveling in manual drive mode. This is because when the forward vehicle 102 is traveling in self-drive mode, it can cruise accurately, thereby enabling the subject vehicle 101 to perform vehicle-following in cruising condition. Since vehicle driving force can therefore be minimized, fuel economy performance and low-noise performance can be enhanced by upshifting the transmission 3.

(3) The vehicle travel control apparatus 100 further includes the GPS unit 34, the map database 35 and the navigation unit 36 for acquiring subject vehicle 101 surrounding road data (FIG. 2). The drive-mode determination unit 62 can use degree of variance calculated by the variance calculation unit 61 and acquired subject vehicle 101 surrounding road data to determine in which of self-drive mode and manual drive mode the forward vehicle 102 is traveling, whereby driving mode of the forward vehicle 102 can be accurately determined. The principle involved here is that when traveling on an uphill road of gentle gradient or sharp gradient, for example, target vehicle speed can be readily maintained in self-drive mode but is difficult to maintain in manual drive mode. Since this enables determination of driving mode of the forward vehicle 102 under such a road condition, accuracy of drive-mode determination is improved.

Various modifications of the aforesaid embodiment are possible. Some examples are explained in the following. In the aforesaid embodiment (FIGS. 5 and 12), inter-vehicle distance L is detected as traveling state of the forward vehicle by the RADAR 312, camera 313 and other inter-vehicle distance detectors, but a travel state detector is not limited to this configuration. In the aforesaid embodiment (FIGS. 5 and 12), the cruise determination unit 52 determines whether the forward vehicle is in cruising condition in accordance with inter-vehicle distance L to the forward vehicle, but a cruise determination unit is not limited to the aforesaid configuration insofar as capable of determining based on detected traveling condition whether the forward vehicle is cruising.

In the aforesaid embodiment (FIGS. 5 and 12), subject vehicle surrounding road data are acquired from the GPS unit 34, map database 35 and navigation unit 36, but a road data acquisition members that acquires a road data around the subject vehicle are not limited to this configuration. A cruise hindrance determination unit can be of any configuration insofar as capable of determining based on acquired road data whether road data posing a hindrance to cruising is included in a route to travel within a predetermined time period from a current time. In the aforesaid embodiment (FIGS. 5 and 12), the lockup clutch 21 installed in the torque transmission path between the engine 1 and the transmission 3 is slipped to adjust power transmission from the engine 1 to the transmission 3 in cruising mode, but another clutch can be provided instead of the lockup clutch. Therefore, the torque converter 2 can be omitted.

In the aforesaid embodiment (FIGS. 5 and 12), the actuator control unit 56 controls the engine 1, transmission 3 and lockup clutch 21 so as to achieve better fuel economy performance and low-noise performance in cruising mode than in normal mode. However, a driving control unit is not limited to the aforesaid configuration insofar as capable of controlling equipment contributing to subject vehicle vehicle-following behavior so as to achieve better fuel economy performance and low-noise performance in cruising mode than in normal mode. For example, solely upshifting of the transmission 3 can be performed without performing slip control of the lockup clutch 21. Optionally, other equipment such as travel motors and the like can be controlled instead of, or together with, the engine 1, transmission 3 and lockup clutch 21.

In the aforesaid embodiment (FIG. 12), the drive-mode determination unit 62 determines in which of self-drive mode and manual drive mode the forward vehicle is traveling and alters mode of following the forward vehicle in accordance with the determination result. The follow mode data with respect to the forward vehicle at this time are also useful with regard to other modes directed at the forward vehicle (e.g., overtaking). Therefore, the result of determinations by the drive-mode determination unit can also be utilized when traveling in other modes.

Although a stepped transmission is used as the transmission 3 in the aforesaid embodiment, a continuously variable transmission can be used instead. In such case, it suffices for a driving control unit serving as the actuator control unit 56 to control the transmission to decrease speed ratio of the transmission when a cruise determination unit determines that the forward vehicle is cruising than when it determines that the forward vehicle is not cruising. Moreover, when a drive-mode determination unit determines that the forward vehicle is traveling in self-drive mode, it suffices for a driving control unit to control the transmission to decrease speed ratio of the transmission than when it determines that the forward vehicle is traveling in manual drive mode.

The present invention can also be used as a vehicle travel control method configured to control an actuator for driving a vehicle with a self-driving capability so that the vehicle follows a forward vehicle in front of the vehicle.

The above embodiment can be combined as desired with one or more of the above modifications. The modifications can also be combined with one another.

According to the present invention, it is possible to maximally enhance fuel enhance efficiency and quietness at a time of following a forward vehicle being cruising.

Above, while the present invention has been described with reference to the preferred embodiments thereof, it will be understood, by those skilled in the art, that various changes and modifications may be made thereto without departing from the scope of the appended claims.

What is claimed is:

1. A vehicle travel control apparatus configured to control an actuator for driving a vehicle with a self-driving capability so that the vehicle follows a forward vehicle in front of the vehicle, the vehicle including an engine, a transmission, and a clutch interposed in a driving path between the engine and the transmission to adjust a transmissibility of a driving power transmitted from the engine to the transmission, the actuator including a clutch actuator driving the clutch, an engine actuator driving the engine, and a shift actuator driving the transmission, the vehicle travel control apparatus comprising:
a travel state detector configured to detect a traveling state of the forward vehicle; and
an electric control unit having a microprocessor and a memory, wherein the microprocessor is configured to perform:
  determining whether the forward vehicle is cruising based on the traveling condition detected by the travel state detector; and
  controlling the actuator so that the vehicle travels in a normal mode, when it is determined that the forward vehicle is not cruising, and the vehicle follows the forward vehicle in a cruise mode with a fuel economy performance or quietness higher than in the normal mode, when the forward vehicle is cruising, and wherein
the microprocessor is further configured to perform
the controlling including controlling the clutch actuator so as to decrease the transmissibility when it is determined that the forward vehicle is cruising than when it is determined that the forward vehicle is not cruising, and controlling the engine actuator and the clutch actuator so as to increase an engine speed to a target engine speed higher than a predetermined misfire speed of the engine and decrease an input speed input to the transmission to a target input speed lower than the predetermined misfire speed, respectively, when it is determined that the forward vehicle is cruising.

2. The apparatus according to claim 1, wherein
the microprocessor is configured to perform
the controlling including controlling the shift actuator so as to decrease a speed ratio of the transmission when it is determined that the forward vehicle is cruising than when it is determined that the forward vehicle is not cruising.

3. The apparatus according to claim 1, wherein
the transmission is a stepped transmission, and
the microprocessor is configured to perform
the controlling including controlling the shift actuator so as to change a speed stage of the transmission to a minimum speed stage of a plurality of speed stages at which the engine speed becomes lower than the predetermined misfire speed when it is determined that the forward vehicle is cruising.

4. The apparatus according to claim 1, further comprising, a road data acquisition member configured to acquire road data around the vehicle, wherein
  the microprocessor is configured to perform
  determining whether predetermined road data posing a hindrance to cruising is included in a route to travel within a predetermined time period from a current time based on the road data acquired by the road data acquisition member, and
  the controlling including controlling the actuator so that when it is determined that the predetermined road data is not included in the route and it is determined that the forward vehicle is cruising, the vehicle follows the forward vehicle in the cruise mode.

5. The apparatus according to claim 1, wherein
the travel state detector is configured to detect an inter-vehicle distance from the vehicle to the forward vehicle, and
the microprocessor is configured to perform
when a frequency of a deviation between the inter-vehicle distance detected by the travel state detector and a predetermined target inter-vehicle distance is expressed in a normal distribution, the determining including determining whether the forward vehicle is cruising based on a mean value and a dispersion value of the normal distribution.

6. The apparatus according to claim 1, wherein
the microprocessor is configured to perform
  the determining including calculating a mean value of a magnitude of an acceleration of the forward vehicle and determining whether the forward vehicle is cruising based on the mean value.

7. A vehicle travel control apparatus configured to control an actuator for driving a vehicle with a self-driving capability so that the vehicle follows a forward vehicle in front of the vehicle, the vehicle including an engine, a transmission, and a clutch interposed in a driving path between the engine and the transmission to adjust a transmissibility of a driving power transmitted from the engine to the transmission, the actuator including a clutch actuator driving the clutch, an engine actuator driving the engine, and a shift actuator driving the transmission, the vehicle travel control apparatus comprising:
  a travel state detector configured to detect a traveling state of the forward vehicle; and
  an electric control unit having a microprocessor and a memory, wherein
  the microprocessor is configured to function as:
  a cruise determination unit configured to determine whether the forward vehicle is cruising based on the traveling condition detected by the travel state detector; and
  an actuator control unit configured to control the actuator so that the vehicle travels in a normal mode, when it is determined that the forward vehicle is not cruising, and the vehicle follows the forward vehicle in a cruise mode with a fuel economy performance or quietness higher than in the normal mode, when it is determined that the forward vehicle is cruising, and wherein
  the actuator control unit is further configured to control the clutch actuator so as to decrease the transmissibility when it is determined that the forward vehicle is cruising than when it is determined that the forward vehicle is not cruising, and control the engine actuator and the clutch actuator so as to increase an engine speed to a target engine speed higher than a predetermined misfire speed of the engine and decrease an input speed input to the transmission to a target input speed lower than the predetermined misfire speed, respectively, when it is determined that the forward vehicle is cruising.

8. The apparatus according to claim 7, wherein
the actuator control unit is configured to control the shift actuator so as to decrease a speed ratio of the transmission when it is determined that the forward vehicle is cruising than when it is determined that the forward vehicle is not cruising.

9. The apparatus according to claim 7, wherein
the transmission is a stepped transmission, and
the actuator control unit is configured to control the shift actuator so as to change a speed stage of the transmission to a minimum speed stage of a plurality of speed stages at which the engine speed becomes lower than the predetermined misfire speed when it is determined that the forward vehicle is cruising.

10. The apparatus according to claim 7, further comprising, a road data acquisition member configured to acquire road data around the vehicle, wherein
  the microprocessor is configured to further function as a cruise hindrance determination unit configured to determine whether predetermined road data posing a hindrance to cruising is included in a route to travel within a predetermined time period from a current time based on the road data acquired by the road data acquisition member, and the actuator control unit is configured to control the actuator so that when it is determined that the predetermined road data is not included in the route and it is determined that the forward vehicle is cruising, the vehicle follows the forward vehicle in the cruise mode.

11. The apparatus according to claim 7, wherein
the travel state detector is configured to detect an inter-vehicle distance from the vehicle to the forward vehicle, and
when a frequency of a deviation between the inter-vehicle distance detected by the travel state detector and a predetermined target inter-vehicle distance is expressed in a normal distribution, the cruise determination unit is configured to determine whether the forward vehicle is cruising based on a mean value and a dispersion value of the normal distribution.

12. The apparatus according to claim 7, wherein
the cruise determination unit is configured to calculate a mean value of a magnitude of an acceleration of the forward vehicle and determine whether the forward vehicle is cruising based on the mean value.

13. A vehicle travel control method controlling an actuator for driving a vehicle with a self-driving capability so that the vehicle follows a forward vehicle in front of the vehicle, the vehicle including an engine, a transmission, and a clutch interposed in a driving path between the engine and the transmission to adjust a transmissibility of a driving power transmitted from the engine to the transmission, the actuator including a clutch actuator driving the clutch, an engine actuator driving the engine, and a shift actuator driving the transmission, the vehicle travel control method comprising:
detecting a traveling state of the forward vehicle; and
determining whether the forward vehicle is cruising based on the traveling condition detected in the detecting, wherein
the controlling includes controlling the actuator so that the vehicle travels in a normal mode, when it is determined that the forward vehicle is not cruising, and the vehicle follows the forward vehicle in a cruise mode with a fuel economy performance or quietness higher than in the normal mode, when the forward vehicle is cruising, and wherein
the controlling includes controlling the clutch actuator so as to decrease the transmissibility when it is determined that the forward vehicle is cruising than when it is determined that the forward vehicle is not cruising, and controlling the engine actuator and the clutch actuator so as to increase an engine speed to a target engine speed higher than a predetermined misfire speed of the engine and decrease an input speed input to the transmission to a target input speed lower than the predetermined misfire speed, respectively, when it is determined that the forward vehicle is cruising.

* * * * *